Sept. 18, 1962     T. A. PULLEYBLANK     3,054,137
HINGE DEVICE

Filed Aug. 25, 1960     2 Sheets-Sheet 1

THOMAS A. PULLEYBLANK
*INVENTOR.*

BY *John R. Faulkner*
*John J. Roethel*

ATTORNEYS

Sept. 18, 1962 T. A. PULLEYBLANK 3,054,137
HINGE DEVICE
Filed Aug. 25, 1960 2 Sheets-Sheet 2

THOMAS A. PULLEYBLANK
*INVENTOR.*

BY John R. Faulkner
John J. Roethel

ATTORNEYS

United States Patent Office 3,054,137
Patented Sept. 18, 1962

3,054,137
HINGE DEVICE
Thomas A. Pulleyblank, Livonia, Mich., assignor to Ford Motor Company, Dearborn, Mich., a corporation of Delaware
Filed Aug. 25, 1960, Ser. No. 51,928
2 Claims. (Cl. 16—128.1)

This invention relates generally to hinges for automotive vehicles.

More particularly, the hinge embodying the present invention is adapted to mount a closure structure, such as an engine compartment hood, for simultaneous swinging and bodily shiftable movement relative to a substantially horizontal fixed hinge axis, the hinge having incorporated therein suitable counterbalance spring means for holding the closure structure in an open position.

It is conventional practice to provide motor vehicles with an engine compartment closure structure or hood which is latched at the front and which is hinged on hinge devices mounted on a transverse frame structure defining the rear of the engine compartment. The transverse hinge axis defined by the hinge devices generally is forward of the rear edge of the closure structure or hood, the rear portion of the latter overlying a forward portion of the body structure, such as the cowl, to the rear of the engine compartment. As a result, the hinge devices must be constructed and arranged to impart a compound motion to the hood as it is raised at its front end. The motion must be such that the rear edge of the hood is raised from and has no interference with the underlying body structure as the hood is swung or tilted about its hinge axis to a fully open position.

It is an object of the present invention to provide a simple, efficient and economical hinge device adapted to function in the manner set forth above.

The hinge device embodying the present invention comprises a support bracket having a longitudinally extending support member. The support member is adapted to be secured in a suitable manner to a transverse frame member such as the front wall of the cowl structure, which wall separates the engine compartment from the passenger compartment. A pair of divergent links or arms are each pivotally supported at one of their ends on the support member. The links or arms are swingable about spaced pivot axes, the axis of the one link or arm being spaced above the other. A control means is provided which couples the links or arms together between their pivot axes and is effective to transmit movement of the one to the other. The links or arms are swingable in opposite directions with the free ends thereof being raised as the hood is opened. A hood attachment member is pivotally connected to the free end of one of the links or arms. A connecting link couples the hood attachment member to the free end of the other link or arm. The connecting link is pivotally connected at one of its ends to the hood attachment member and at its other end to the other link or arm. The connecting link is longer than the link or arm which is directly connected to the hood attachment member and is bodily shiftable by the link or arm to which it is connected as the link or arm which is connected to the attachment member swings through a fixed arc. The movement of the attachment member which results from such construction and arrangement is such that a hood structure mounted thereon is longitudinally shifted forwardly or rearwardly as it is swung to or from an open or closed position, respectively.

The present invention is an improvement over the disclosure of application Serial No. 835,735, filed August 24, 1959, now Patent No. 2,994,907, by Albert J. Hammond, and owned by the assignee of he present application. The improvement relates to the control means coupling the links or arms together for correlated swinging movement. In the construction disclosed in the above-mentioned application, the control means was described as a specially formed or shaped pin or member having a cylindrical portion journalled in one of the links and an eccentric projection rotatably coupled to the other of said links. This part was found to be disproportionately expensive to manufacture. In the present invention, the specially shaped pin or member has been replaced by two simple shoulder rivets and a washer or collar device. Each link or arm is provided with a shoulder rivet extending toward the other link or arm, the shoulder rivets being of sufficient length to have substantial lateral bearing engagement with each other. The washer or collar device is placed to ring both rivets and to hold them in lateral engagement with each other as their respective links or arms are swung about their pivot axes. The result is the desired controlled or correlated swinging movement of the links or arms.

Other objects, advantages and features of the present invention will be made more apparent as the description proceeds, particularly when considered in connection with the accompanying drawings, wherein.

Figure 1:
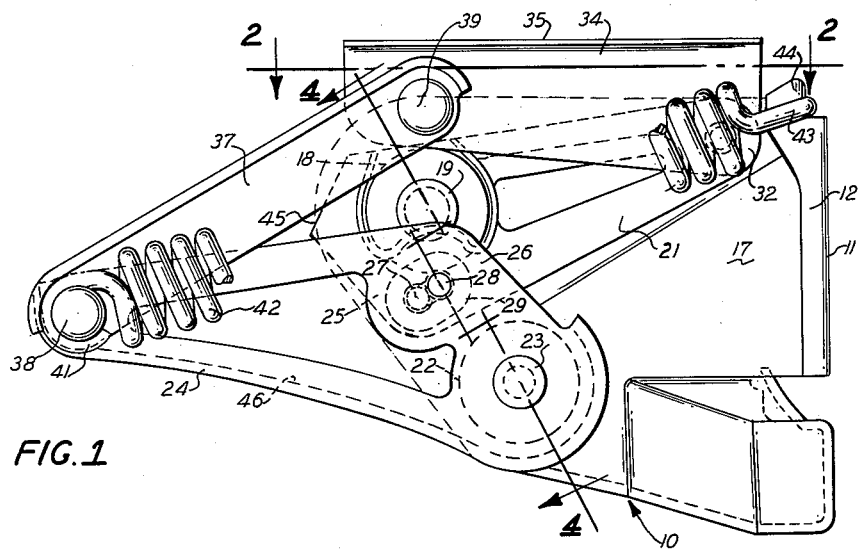
FIG. 1 is a side elevation of the hinge assembly as it appears in lowered or closed position of the closure structure or hood.

Referring now to the drawings, and particularly to FIG. 1, there is illustrated a hinge assembly, generally designated 10, adapted to mount a closure structure, such as a hood or the like on a vehicle body. The hood (not shown) is of the type adapted to be opened from its forward edge and is hinged adjacent its rear edge by means of a pair of the hinge assemblies 10, one located adjacent each side of the hood. Inasmuch as each of the hinge assemblies 10 are of symmetrical construction, only one will be described in detail.

Figure 2:
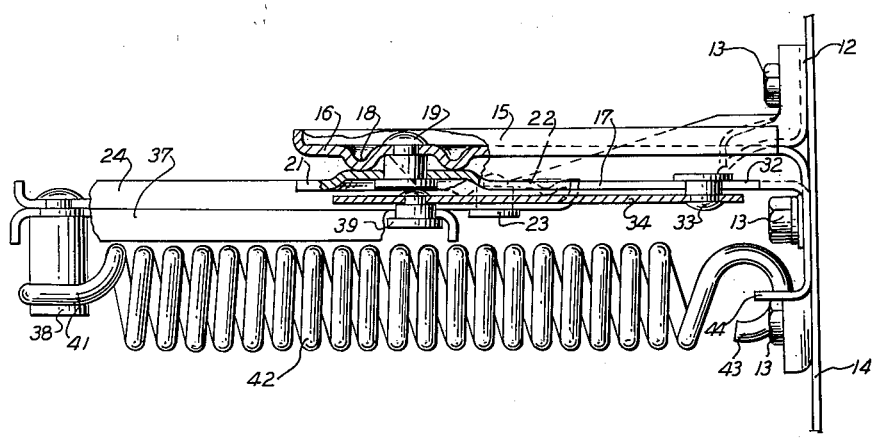
FIG. 2 is a sectional view taken substantially through the line 2—2 of FIG. 1 looking in the direction of the arrows.
Figure 3:
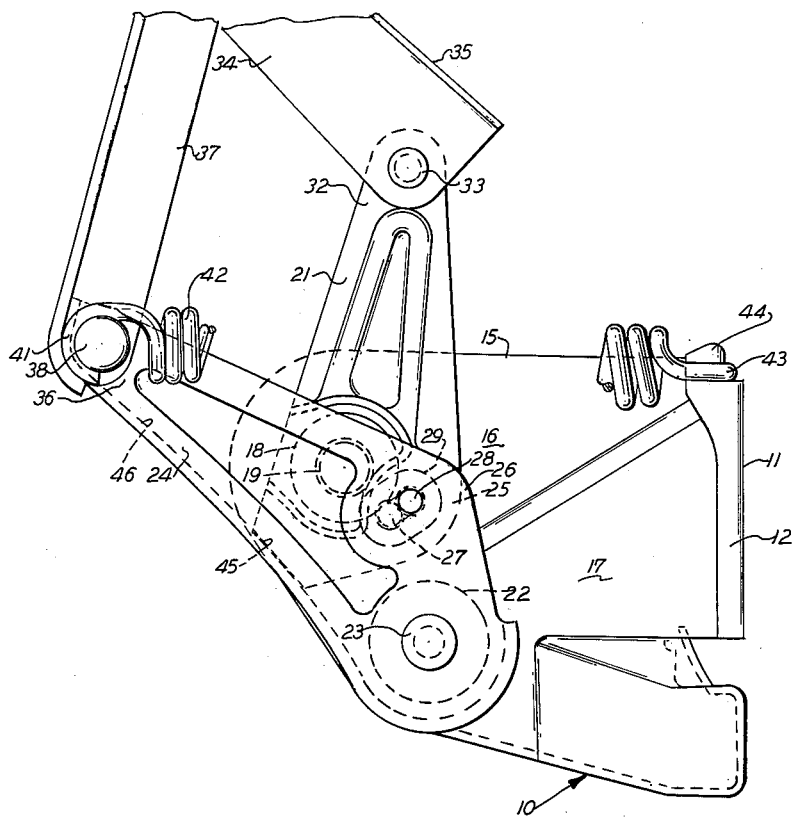
FIG. 3 is a view in part similar to FIG. 1 illustrating the hinge assembly when the closure structure or hood is in a raised or open position.
Figure 4:
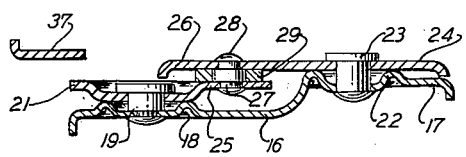
FIG. 4 is a sectional view taken substantially through the line 4—4 of FIG. 1 looking in the direction of the arrows.

A hinge assembly 10 comprises a bracket 11 having a flange 12 adapted to be secured by bolts 13 (see FIG. 2) or other suitable securing means to a transverse frame member 14 defining an end wall of the compartment to be closed by the hood. The main plate portion 15 of the bracket 11 extends in a longitudinally forward direction. The main plate portion 15 is divided into two laterally offset portions 16 and 17, respectively, the line of division extending substantially diagonally across the plate portion, as best seen in FIGS. 3 and 4.

At its upper forward or left-hand corner, as viewed in FIG. 1, the main plate portion 15 of the bracket 11 is provided with an embossed portion 18. Pivotally mounted on this embossed portion by a pivot pin 19 is a link or arm 21. The main plate portion 15 is provided with a second embossed portion 22 located below and rearwardly of the embossed portion 18. Pivotally mounted on this latter embossed portion by a pivot pin 23 is a second link or arm 24. It will be noted that the embossed portion 18 is located on the offset plate portion 16 and the embossed portion 22 on the offset plate portion 17. The two links or arms 21 and 24 are thus mounted for swinging movement in laterally offset parallel planes.

The links or arms 21 and 24 have overlapping portions 25 and 26, respectively, which lie substantially between the respective pivot axes 19 and 23. Each overlapping portion 25 and 26 is provided with a shoulder rivet 27 and 28, respectively. Each shoulder rivet projects perpendicularly from the surface of the overlapping portion in which it is mounted toward the opposed surface of the overlapping portion of the other link or arm. The arragement of the shoulder rivets is such that they are movable in intersecting orbital paths about the pivot axes of their respective links or arms. Thus, as shown in FIG. 1, they may be positioned in abutting relation to each other. They are adapted to be maintained in this relationship by a coupling device 29 in the form of a washer or collar device which is preferably oval shaped. The coupling device 29 is of sufficient thickness to maintain the overlapping portions 25 and 26 of the links or arms 21 and 24 in proper spaced relationship as they swing in their laterally offset parallel planes. The effect of this construction and arrangement on the operation of the hinge will hereinafter be explained.

The free end 32 of the link arm 21 is pivotally connected by a suitable pivot stud 33 or the like to the vertical flange 34 of a hood attachment bracket 35. The free end 36 of the link or arm 24 is also connected to the hood attachment bracket 35 but through the intermediary of a connecting link 37. The link 37 is pivotally connected at one of its ends by a pivot stud or the like 38 to the free end 36 of the link or arm 24 and at its other end by a pivot stud or the like 39 to a point on the flange 34 of the hood attachment bracket 35. The pivot axis of the stud 39 is spaced from and parallel to the pivot axis of the stud 33 connecting the free end 32 of the arm 21 to the hood attachment bracket flange 35. The pivot stud 38 is somewhat elongated (see FIG. 2) to provide an anchor for an end loop 41 of a coiled counterbalanced spring 42. The other end loop 43 of the spring 42 is hooked over a notched portion 44 of the bracket flange 12.

To complete the physical description of the hinge assembly 10, it will be noted that the arm 21 is provided at the left end thereof as viewed in FIG. 1, with a straight edge portion 45. The straight edge portion 45 is adapted to abut the inner surface of a flange 46 on the link or arm 24 to provide a positive stop limiting the upward swinging movement of the hood (see FIG. 3).

It will be noted from an examination of FIG. 1, which shows the hinge assembly in the position it occupies when the hood is closed, that the link or arm 21 extends toward the flange 12 or rearwardly at a slightly upwardly inclined angle to the horizontal or longitudinal axis on the hinge assembly. The link or arm 21 extends away from the flange 12 or forwardly, also at a slightly upwardly inclined angle relative to the horizontal or longitudinal axis of the hinge assembly. The links or arms 21 and 24 are thus in diverging relationship to each other in closed position of the hood. The longitudinal axis of the coil spring 42 passes slightly below the pivot axis 19 of the arm 21 but lies above the pivot axis 23 of the arm 24. In this position the spring effect is substantially neutralized. The spring exerts neither an opening or closing force on the hood.

To open the hood or closure structure, it is first unlatched at its free or front end, the end opposite that to which the hinge devices are attached. After being unlatched the free or front end may be manually raised. As soon as the free or front end of the hood begins to move upwardly, the links or arms of the hinge assembly come into play. The link or arm 21 swings in a counterclockwise direction, as viewed in FIG. 1 about its pivot axis 19. It will be readily apparent that the link or arm 21 in swinging upwardly and forwardly tends to cause the rear end of the hood attachment bracket 35 to be urged upwardly and forwardly, also. The raising of the hood might be considered only with respect to the link or arm 24 and the link 37 connected thereto. As the front end of the hood is raised, assuming that the link or arm 21 is fixed, the hood attachment bracket 35 pulls upwardly on the link 37. This upward movement is transmitted to the link or arm 24 causing the latter to be swung upwardly in a clockwise direction about its pivot axis 23. However, because of the coupling device 29 which circumscribes the rivets 27 and 28 between the overlapping portions of the arms or links 21 and 24, regardless of which link might be considered to be first influenced by the upward movement of the front end of the closure structure or hood, the other link must respond to such movement. Thus the hood attachment bracket 35, and therefore the closure structure or hood mounted thereon, must move in a predetermined path. As seen in FIG. 3, this movement is such that the hood attachment member 35 is moved forwardly of its closed position and is simultaneously raised upwardly. Since its rear end is moving about a fixed pivot axis and its front end is moving about the fixed axis 23 of the arm 24 and also with respect to the moving pivot connection 38 between the arm 24 and link 37, the front end of the attachment bracket is raised upwardly higher than its rear end. It is believed apparent that the stability of the hinge assembly is dependent on the coupling device 29 which connects the upper and lower arms 21 and 24 through their rivets 27 and 28 in such manner that the motion of the one will transfer motion to the other.

The coupling device 29 circumscribing the rivets 27 and 28 forcibly retains the latter in tangential abutting relationship as they travel in their orbital paths about the pivot axes of their respective links. The rivets thus relatively roll one around the other from their FIG. 1 or hood-down relationship to their FIG. 3 or hood-raised relationship. The coupling device 29, which may be considered as lying freely between the overlapping portions 25 and 26 of the links or arms 21 and 24, respectively, bodily shifts to accommodate the shifting positions of the rivets. It will be readily apparent from a study of FIG. 3 that the orbital paths of the rivets 27 and 28 begin to diverge quite rapidly beyond the positions of the rivets shown. Since the rivets are circumscribed by the coupling device 29, the movement of the hood in opening direction is automatically limited. That is, the rivet circumscribing coupling device 29 prevents movement of the links or arms beyond a position at which the tangential abutting relationship of the rivets 27 and 28 would tend to be disrupted. This self-limiting feature does not come into play in the other direction, i.e., hood closing direction, since engagement of the hood with the marginal edges of the engine compartment automatically limits the orbital movement of the rivets 27 and 28 in hood closing direction of movement.

It will be noted that the raising of the hood causes the coil spring 42 to be raised from the position shown in FIG. 1 to the position shown in FIG. 3. In this latter position, the longitudinal axis of the coil spring is above the pivot axis 19 and tends to pull the pivotal connection 38 between the link 37 and the arm 24 toward the flange 12. In so doing, it exerts an upward force on the connecting link 37 which tends to keep the hood attachment bracket 35 and therefore the hood mounted thereon in a raised position.

The closing movement of the hinge assembly is a reverse of its opening movement. To close the hood, it is merely necessary to exert enough manual force on the free end or open end of the hood or closure structure sufficient to overcome the force of the spring 42 tending to maintain the hood structure in an open position. The coupled links or arms 21 and 24 control the movement of the hood structure so that it swings downwardly as it simultaneously moves rearwardly into closed position.

It will be understood that the invention is not to be limited to the exact construction shown and described, but that various changes and modifications may be made without departing from the spirit and scope of the invention as defined in the appended claims.

I claim:
1. In a hinge device for a swingable closure structure on a vehicle body, a support bracket, a pair of divergent links each pivotally supported at one of their ends on said support bracket, the pivot axes of said links being spaced from one another, control means coupling said links together for correlated swinging movement, said control means comprising a cylindrical member fixed to each link and movable therewith in intersecting orbital paths about the pivot axes of said links, respectively, and a coupling device comprising an annular member circumscribing said cylindrical members and maintaining the latter in tangential abutting relationship as said closure structure is swung from a closed to an open position and vice versa, said annular member inherently limiting opening movement of said closure structure upon said cylindrical member reaching a position in their orbital movements at which they would become tangentially disengaged.

2. A hinge device for a swingable closure structure on a vehicle body comprising a support bracket, a pair of divergent links each pivotally supported at one of their ends on said support bracket, the pivot axes of said links being spaced from one another, said links having overlapping portions, control means coupling said links together for correlated swinging movement, said control means comprising a cylindrical member on each link overlapping portion, each cylindrical member extending toward the other link and being movable in intersecting orbital paths about the pivot axes of said links, respectively, and a coupling device comprising an annular member circumscribing said cylindrical members and maintaining the latter in tangential abutting relationship as said closure structure is swung from a closed to an open position and vice versa, said annular member inherently limiting opening movement of said closure structure upon said cylindrical members reaching a position in their orbital movements at which they would become tangentially disengaged, said links being swingable in opposite directions with the free ends thereof being raised as said hood is opened, a hood attachment member pivotally connected to the free end of one of said links, a connecting link pivotally connected at one end to the other end of said hood attachment member and at its other end to the free end of said other link, said connecting link being longer than said one link and bodily shiftable by said other link as said one link swings through a fixed arc, the resultant attachment member movement being such that the hood structure mounted thereon is longitudinally shifted as it is swung to or from an open or closed position.

References Cited in the file of this patent
UNITED STATES PATENTS

| | | |
|---|---|---|
| 2,683,280 | Martens | July 13, 1954 |
| 2,956,303 | Fiedler | Oct. 18, 1960 |